United States Patent
Bishop et al.

(10) Patent No.: US 11,745,676 B2
(45) Date of Patent: Sep. 5, 2023

(54) MOTOR VEHICLE LOCKING DEVICE

(71) Applicant: Kiekert AG, Heiligenhaus (DE)

(72) Inventors: Bryan Bishop, Howell, MI (US); Hector Verde, Farmington Hills, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 17/571,769

(22) Filed: Jan. 10, 2022

(65) Prior Publication Data
US 2023/0219510 A1    Jul. 13, 2023

(51) Int. Cl.
*B60R 16/023*   (2006.01)
*E05B 81/80*    (2014.01)

(52) U.S. Cl.
CPC ............ *B60R 16/023* (2013.01); *E05B 81/80* (2013.01)

(58) Field of Classification Search
None
See application file for complete search history.

(56) References Cited

U.S. PATENT DOCUMENTS

| 2019/0040660 A1* | 2/2019 | Gabriel | E05B 81/78 |
| 2019/0178000 A1* | 6/2019 | Schnetter | E05B 85/103 |

FOREIGN PATENT DOCUMENTS

| DE | 10360418 A1 | 7/2005 |
| DE | 112013000497 T5 | 12/2014 |
| DE | 102014002379 A1 | 8/2015 |

* cited by examiner

*Primary Examiner* — Jared Fureman
*Assistant Examiner* — Aqeel H Bukhari
(74) *Attorney, Agent, or Firm* — Renner, Otto, Boisselle & Sklar, LLP

(57) ABSTRACT

The invention is directed to a motor vehicle locking device, comprising a motor vehicle locking module and an electronics module, said electronics module being spatially and functionally separated from the motor vehicle locking module, wherein the motor vehicle locking module and the electronics module are connected to exchange data and optional are connected regarding power supply, the motor vehicle locking device further comprising a first plug connector for connecting the electronics module directly to the motor vehicle locking module to establish a mechanical and data connection between the modules and optionally a power supply connection between the two modules, and wherein the first plug connector is designed to be plugged in the modules to established said connections and plugged out of the modules to sever said connections.

18 Claims, 2 Drawing Sheets

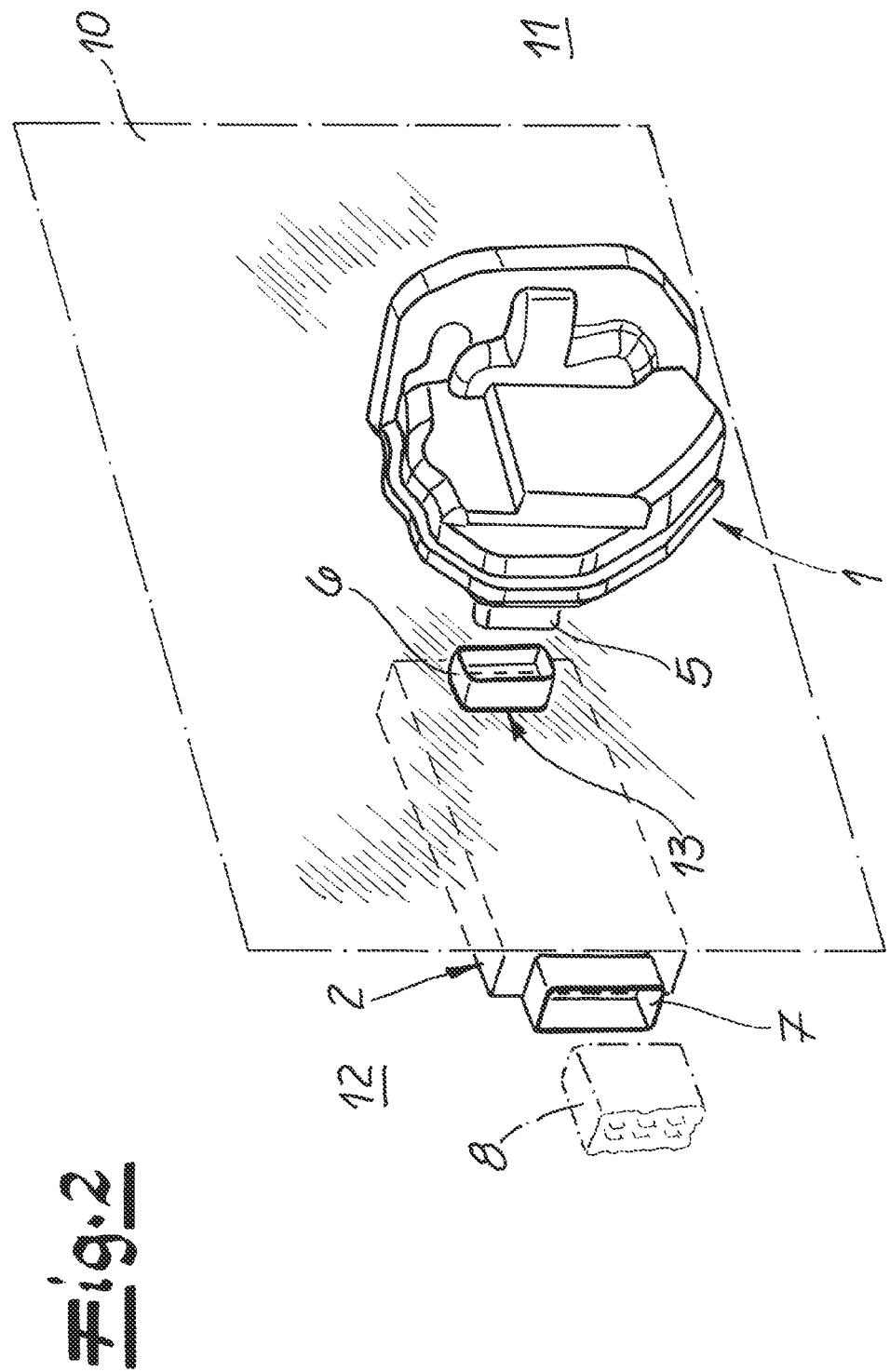

MOTOR VEHICLE LOCKING DEVICE

TECHNICAL BACKGROUND OF THE INVENTION

Figure 1:
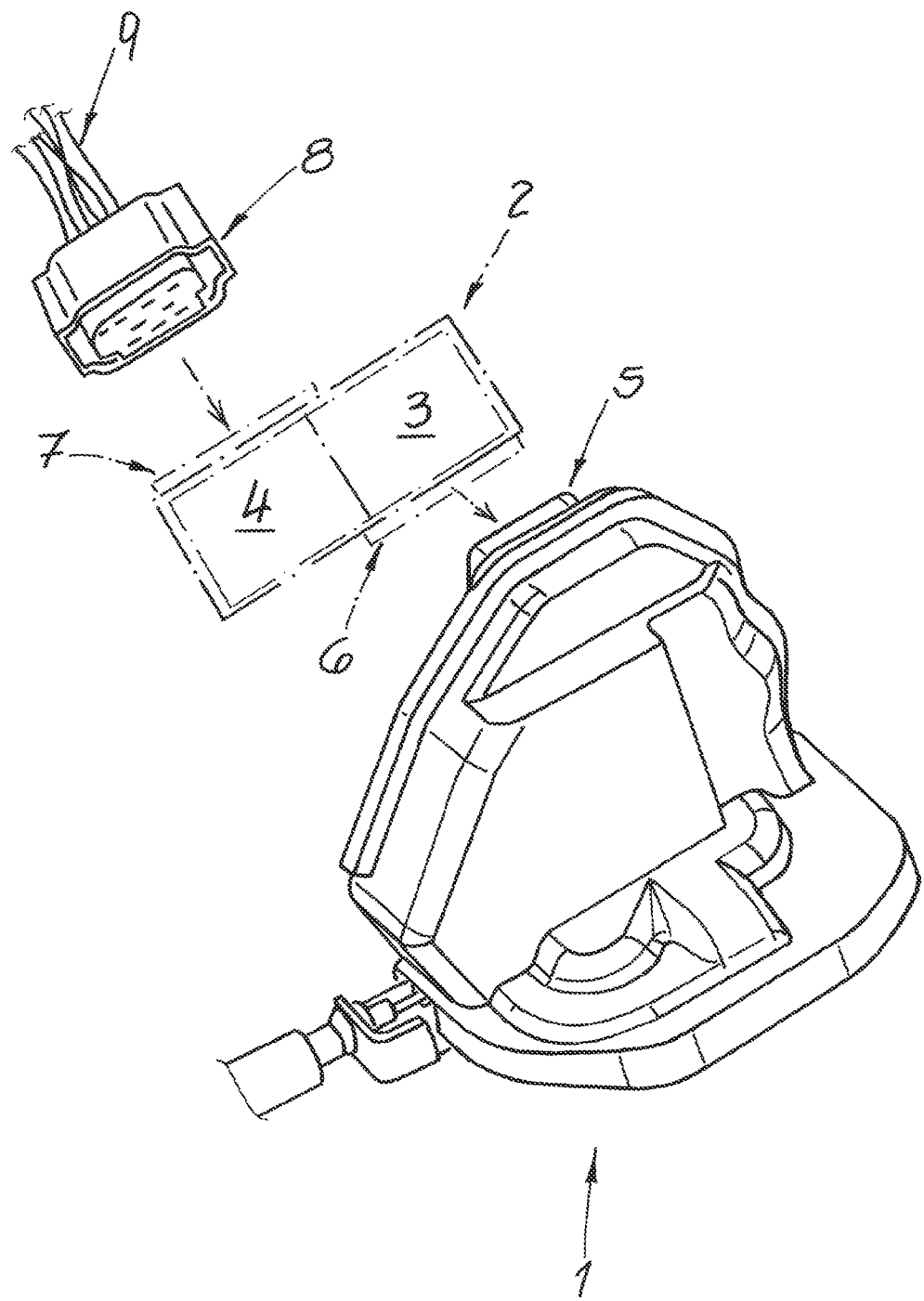

The invention is directed to motor vehicle locking device, comprising a motor vehicle locking module and an electronics module, said electronics module being spatially and functionally separated from the motor vehicle locking module, wherein the motor vehicle locking module and the electronics module are connected to exchange data and optionally are connected for power supply.

In the state of the art concerning motor vehicle locking devices, it is already known to group all components needed for specific functions into separate modules. The term "module" is to be understood to mean a part of a whole that is spatially and functionally separated from one or multiple other parts of the whole and can be connected via a connection to the one or multiple other parts of the whole to ultimately form said whole.

The DE 10 2014 002 379 A1 filed by the applicant discloses an electric operating unit for locking and unlocking of a motor vehicle, comprising an electric locking device for a motor vehicle door. Said electric operating unit further comprises an electric drive for locking and/or unlocking of the electric locking device. For supplying power to the electric drive both an external power source and a power source provided on the vehicle body are provided. The external power source can be connected to the electric drive via a standard interface.

DE 11 2013 000 497 T5 discloses a motor vehicle access system and controller, where inter alia a power supply, a power management controller and a locking controller are arranged in a casing. The casing can be integrated in an unlocking grip module or can be arranged in the interior of a motor vehicle door. In connection therewith a sealed connector for interconnection with an unlocking grip of the motor vehicle and a sealed cable harness for use in the motor vehicle door are disclosed.

The prior art according to DE 103 60 418 A1 describes a motor vehicle locking system with multiple motor vehicle locking devices, where each motor vehicle locking device is provided with an actuating element and an electronics module. In addition, a central module is provided. The actuating elements receive the information for unlocking respectively locking and/or opening of the respective motor vehicle locks. Communication electronics are provided for the data exchange, said data exchange being provided in form of a radio link.

The prior art has proven itself in principle with regard to the modular build of the motor vehicle locking module and the spatially and functionally separate electronics module. Insofar as in this and the other prior art a radio link is provided for data exchange, such a radio link is unsuitable for practical use due to several reasons. Today, due to the external electromagnetic fields of telephone poles, radio transmitters and so on, disturbances in the radio link cannot be avoided and accordingly an uninterrupted operation cannot be assured. In addition, if the electronics module and the motor vehicle locking module are separated by metallic separation walls provided in a motor vehicle door, establishment of a radio link is inhibited due to shielding by the metallic walls.

In regard to further prior art, therein modular solutions are proposed in most cases for motor vehicle door grip or more generally actuation units, for example in DE 10 2014 002 379 A1 or DE 11 2013 000 497 T5. In such actuation units respectively, door grips are used for such modular solutions already since their arrangement exposed on an outer surface of a motor vehicle leaves practically no other choice. In contrast to this, a motor vehicle locking device is typically arranged in the interior of a motor vehicle door, which makes it more difficult to create a modular construction.

Currently there are efforts to standardize motor vehicle locking modules, in the hopes of realising advantages regarding construction and costs. Such a standardization requires an adaption of the control respectively of the electronics module. Current solutions are not flexible enough, as the electronics module is built into the motor vehicle locking module or a radio link not suited for practical applications is proposed. This is the state where the invention proceeds from.

Background of the invention is the technical problem of further developing a motor vehicle locking device of the previously described construction so that the flexibility is enhanced compared to the current state of the art without loss of functionality.

As solution for this technical problem the invention proposes that the motor vehicle locking module and the electronics module are connected to exchange data and optionally are connected for power supply, the motor vehicle locking device further comprising a first plug connector for connecting the electronics module directly to the motor vehicle locking module to establish a mechanical and data connection between the modules and optionally a power supply connection between the two modules, and wherein the first plug connector is configured to be plugged into the modules to established said connections and plugged out of the modules to sever said connections.

Within the scope of the invention the electronics module on one hand and the motor vehicle locking module on the other hand are spatially and functionally separated, designed and manufactured from one another. Through this, the option of equipping the motor vehicle locking module either with an electronics module of the vehicle lock manufacturer or with an electronics module of another manufacturer is given. This option is possible because a first plug connector connects the electronics module directly to the motor vehicle locking module and can be plugged in to connect the modules and plugged out to disconnect the modules. The first plug connector provides an interface for connecting both modules to establish a mechanical and data connection.

Since the first plug connector provides not only a data connection, but also a mechanical connection, further fixing elements for the electronics module are not necessary. Instead, the first plug connector provides mechanical fixing of the electronics module to the motor vehicle door locking module.

Optionally, as a further connection between the electronics module and the motor vehicle door locking module a power supply connection can be established, i.e. a connection that enables the transfer of electric power between the modules. If such a power supply connection is provided, the electronics module can be equipped with a power supply unit.

In this regard it has been found to be advantageous if the electronics module contains a control unit. With this control unit of the electronics module all relevant locking functions and states can be controlled. For example, with the control unit the different functional states like "locked/unlocked", "child lock on/child lock off" or "double lock on/double lock off" can be controlled. In addition, the control unit can be used to control for example a cinching function of a catch or opening functions like a shifting of an associated vehicle door into an open position. Also and preferred, the control unit is used to control an electric opening of the motor vehicle door lock, when the motor vehicle door lock in question is a so called "electric lock", that is a motor vehicle door lock equipped with an electromotor drive for opening of a locking mechanism.

Advantageously, the electronics module comprises in addition to the control unit a power supply unit. This power supply unit can, for example, be an emergency power supply, which is provided in order to ensure the supply of electric power to the electromotor drive in case the regular power supply provided by the main power supply in the motor vehicle carrosserie fails. Such a failure can occur, for example, if the main power supply is discharged due to a long standing time or if the connection to the main power supply is interrupted due to a crash. Of course, emergency operation of the electromotor drive can be controlled by the control unit. In conclusion, the previously mentioned locking functions of the regular operation of the control unit are a list of exemplary functions and do not list all the functions the control unit can perform.

The first plug connector advantageously comprises a plug and a socket. Usually the plug is arranged on the electronics module and the socket on the motor vehicle locking module. Of course, the arrangement can be switched. with the socket arranged on the electronics module and the plug arranged on the motor vehicle locking module.

In additional it has shown itself to be specially advantageously if the electronics module is connected to a cable harness via a second plug connector to establish a mechanical and data connection and optionally a power supply connection. Said connections are being designed to be easily severable by plugging the second plug connector out. Via the cable harness, the electronics module is supplied with the required electric power. In addition, the cable harness provides a data connection of the electronics module with a central control unit arranged in an interior of the motor vehicle carrosserie.

To achieve a long-lasting connection between the electronics module and the motor vehicle locking module and also optionally between the electronics module and the cable harness, the first plug connector and the optional second plug connector are designed ingress protected. To achieve said ingress protection, the plug and/or the socket of the first respectively of the second plug connector are equipped with an inlaid sealing that surrounds the whole plug and/or socket. Said ingress protected connection provided by the two plug connections ensures that humidity, splash water, dust etc. cannot intrude into the connection and interrupt the electrical or data connection. This feature is important to ensure a long operating life of the motor vehicle locking device.

According to a further advantageous embodiment of the invention it is provided that the first and/or second plug connection reaches through an opening of an interior wall of a motor vehicle door. Said interior wall is preferably a dividing wall between a wet space and a dry space of the motor vehicle door. A wet space of a motor vehicle door is that area of the motor vehicle door where humidity can ingress. A typical area of ingress of humidity is an entry section of the motor vehicle door locking module, through with a striker mounted on the motor vehicle carrosserie reaches to interact with the locking mechanism.

Therefore the motor vehicle door locking module is usually arranged in the wet space of the motor vehicle door, whereas the electronics module is arranged in a dry space of the motor vehicle door. This dry space of the motor vehicle door is separated from the wet space by the dividing wall.

Since the electronics module is arranged in the dry space, special sealing arrangements for the electronics module are not needed. In this way, the electronics module can be provided in cheaper way due to not needing additional sealing as it is known from prior art, where the electronics module is arranged in the interior of the motor vehicle door locking module and accordingly within the wet space of the motor vehicle door. This protection is provided according to the invention by the dividing wall and the design of the first and second plug connector as ingress protected, together with arrangement of the electronics module in the dry space of the motor vehicle door.

In this regard it is furthermore provided for in a further embodiment of the invention that the first and/or second plug connector is configured to seal the opening in the interior wall while reaching through. In this way, humidity from the wet space can be prevented from entering the dry space through the opening in the dividing wall.

As a result, a motor vehicle locking device is provided that enables a flexible construction and a variable adaptation to differing mounting situations and requirements. Due to the modular construction the same motor vehicle locking module can be connected to an electronics module of the same manufacturer or of a different manufacturer and even can be utilized for a motor vehicle door lock without an electronics module. With the construction according to the invention the motor vehicle locking module can be reduced to the essential parts and can therefore be used as a universally adaptable module for use in a platform strategy.

In addition, due to this construction the electronics module can be placed in a dry space of the motor vehicle door, so that further sealings that until now were necessary can be omitted. Preferably the control unit in the interior of the electronics module as well as the optional power supply unit are provided on a circuit board. Since the electronics module can be arranged in the dry space of the motor vehicle door due to the construction according to the invention, encapsulation of the circuit board via, e.g., a compound. This further reduces the costs necessary for manufacturing the motor vehicle locking device according to the invention. This is a further import advantage the invention offers.

The invention is further directed to a motor vehicle door having an interior wall with an opening, said interior wall being a dividing wall between a wet space and a dry space of the motor vehicle door, further having a motor vehicle locking device according to the previously outlined construction, with the dividing wall being equipped with sealing means around the opening.

The invention is in the following described in detail with reference to the following drawings showing two embodiments of the invention, showing in:

FIG. 1 the motor vehicle locking device according to a first embodiment, and in

FIG. 2 the motor vehicle locking device according to a second embodiment within the interior of a motor vehicle door.

The figures show a motor vehicle locking device, comprising a motor vehicle locking module 1 and an electronics module 2, said electronics module 2 being spatially and functionally separated from the motor vehicle locking module 1. The motor vehicle locking module 1 comprises a motor vehicle door lock designed as an electric lock, i.e. the motor vehicle locking module 1 comprises an electromotor drive for opening a locking mechanism fundamentally comprised of a catch and a pawl.

The electronics module 2 comprises a control unit 3 and in one exemplary embodiment additionally a power supply unit 4. Via the control unit 3 all exemplary locking functions mentioned in the technical description can be controlled. The power supply unit 4 according to the embodiment is designed as an emergency power supply and comprises one or more accumulators, capacitors etc., which enable the provision of the electric power required to open the locking mechanism of the motor vehicle locking module 1 in the case a main power source (not shown in the drawings) arranged in the interior of the motor vehicle carrosserie fails or the connection to the main power source is interrupted. It is also possible to utilise the power supply unit 4 to supply power not (or not only) to power the electromotor drive in the interior of the motor vehicle locking module 1, but also to supply power to other elements.

Both modules 1, 2 are connected to exchange data and also in regard to power supply. To achieve this, the electrons module 2 is connected directly to the motor vehicle locking module 1 via a first plug connector, where a connection between the two modules 1, 2 can established and severed by plugging in and plugging out the first plug connector. As soon as the electronics module 2 is directly connected to motor vehicle locking module 1 via the first plug connector, the control unit 3 in the interior of the electronics module 2 can exchange data with, e.g. the electromotor drive (not shown explicitly in the drawings), query sensors, etc. Additionally, there is a connection for power supply, as the power supply unit 4 as emergency power source can supply the electromotor drive with the required electric power in case of need. A mechanical connection is established as the electronics module 2 is held—when the first plug connector is plugged in—via the first plug connector on a surface of the motor vehicle locking module 1, so that both modules 1, 2 form a single building block.

In addition to the first plug connector a further, second plug connector is provided. The electronics module 2 is connected via this second plug connector to a cable harness 9, where this connection is designed to be severable without destruction of the second plug connector. The second plug connector provides again a mechanical and a data connection and also a connection for power supply of the cable harness 9 to the electronics module 2 via the second plug connector.

By means of the connection to exchange data the control unit 3 can communicate via the cable harness 9 with a central control unit (not depicted in the drawings) arranged in an interior of the motor vehicle carrosserie. The cable harness 9 establishes a power supply connection with a main power source (not depicted in the drawings) arranged in an interior of the motor vehicle carrosserie to provide power for the electromotor drive of the motor vehicle locking module 1 during normal operation. Furthermore, the second plug connector also provides a mechanical connection of the cable harness 9 on the electronics module 2.

The first plug connector is equipped with a plug 5, which can be plugged in and out of an associated socket 6 to provide a severable connection. Likewise, the second plug connector is equipped with a plug 8 and a socket 7, that work together in the same way. Both plug connectors are designed to be ingress protected. To achieve this, the plugs 5, 8 and/or the sockets 6, 7 are equipped with sealings.

As can be seen according to the drawings, the plug 5 of the first plug connector is arranged on the motor vehicle locking module 1 and the socket 6 is arranged on the electronics module. Of course, the arrangement can be inverted and doing so poses no challenge for a person skilled in the arts. With regard to the second plug connector the plug 8 is arranged on the cable harness, whereas socket 7 is arranged on the electronic module 2. Of course, also for this plug connector the inverted arrangement can be chosen.

FIG. 2 shows an embodiment of the invention where to motor vehicle locking device is shown mounted in a motor vehicle door. Of the motor vehicle door itself only an interior wall 10 is depicted. The interior wall 10 forms a dividing wall 10 dividing a wet space 11 from a dry space 12 in an interior of the motor vehicle door. The motor vehicle locking module 1 is arranged in the wet space 11, whereas the electronics module 2 is arranged in the dry space 12.

In this case the first plug reaches through an opening 13 in the dividing wall 10 and is configured to seal the opening 13 in the interior wall 10 while reaching through. To provide the required sealing, the dividing wall 10 might have sealing means around the opening 13. In this way, an ingress protected closing of the opening 13 is achieved. If the plug 5 of the first plug connector is plugged in the socket 6, due to the design of the plug connector as ingress protected, it is ensured that humidity or dust can pass from the wet space 11 to the dry space 12.

LIST OF REFERENCE SIGNS 1 motor vehicle door module
2 electronics module
3 control unit
4 power supply unit
5, 8 plug
6, 7 socket
9 cable harness
10 dividing wall
11 wet space
12 dry space
13 opening

The invention claimed is:
1. A motor vehicle locking device comprising:
a motor vehicle locking module and an electronics module, said electronics module being spatially and functionally separated from the motor vehicle locking module, wherein the motor vehicle locking module and the electronics module are connected to exchange data; and
a first plug connector for connecting the electronics module directly to the motor vehicle locking module to establish a mechanical and data connection between the electronics and motor vehicle locking modules;
wherein the first plug connector is configured to be plugged into the electronics and motor vehicle locking modules to establish the mechanical and data connection and plugged out of the modules to sever the mechanical and data connection,
wherein the first plug is configured for extension through an opening in an interior wall of the motor vehicle to selectively establish and sever the mechanical and data connection between the motor vehicle locking module on a first side of the wall and the electronics module on a second side of the wall opposite the first side,
wherein the interior wall is a dividing wall between a wet space and a dry space of the motor vehicle door, and wherein the first side of the wall is wet space and the second side is the dry space.
2. The motor vehicle locking device according to claim 1, wherein the first plug connector comprises a plug connected to one of the electronics or motor vehicle locking modules and a socket connected to the other of the electronics or motor vehicle locking modules.

3. The motor vehicle locking device according to claim 2, further comprising a second plug connector for connecting the electronics module directly to a cable harness to establish a mechanical and data connection between the electronics module and the cable harness, wherein the second plug connector is configured to be plugged in to establish the mechanical and data connection and plugged out to sever the mechanical and data connection.

4. The motor vehicle locking device according to claim 3, wherein the second plug connector further is configured to connect the electronics module to provide a power supply connection between the electronics module and the cable harness.

5. The motor vehicle locking device according to claim 3, wherein the second plug connector reaches through an opening of an interior wall of a motor vehicle door.

6. The motor vehicle locking device according to claim 5, wherein the interior wall is a dividing wall between a wet space and a dry space of the motor vehicle door.

7. The motor vehicle locking device according to claim 5, wherein the second plug connector is configured to seal the opening in the interior wall while reaching through the opening.

8. The motor vehicle locking device according to claim 1, further comprising a second plug connector for connecting the electronics module directly to a cable harness to establish a mechanical and data connection between the electronics module and the cable harness, wherein the second plug connector is configured to be plugged in to established the mechanical and data connection and plugged out to sever the mechanical and data connection.

9. The motor vehicle locking device according to claim 8, wherein the second plug connector further is configured to connect the electronics module to provide a power supply connection between the electronics module and the cable harness.

10. The motor vehicle locking device according to claim 8, wherein the first and the second plug connectors are ingress protected.

11. The motor vehicle locking device according to claim 1, wherein the first plug connector is configured to seal the opening in the interior wall while reaching through the opening.

12. The motor vehicle locking device according to claim 1, wherein the electronics module comprises a control unit and a power supply unit.

13. The motor vehicle locking device according to claim 1, wherein first plug connector further is configured to provide a power supply connection between the electronics and motor vehicle locking modules.

14. The motor vehicle locking device according to claim 1, wherein the only mechanical fixing of the electronics module to the motor vehicle locking module is the first plug.

15. The motor vehicle locking device according to claim 1, wherein but for the first plug connector establishing the mechanical and data connection between the electronics and motor vehicle locking modules when the electronics module is fixed to the motor vehicle locking module, the electronics module and the motor vehicle locking module are not in data connection.

16. A motor vehicle door comprising:
an interior wall with an opening, the interior wall being a dividing wall between a wet space and a dry space of the motor vehicle door;
a motor vehicle locking device comprising a motor vehicle locking module and an electronics module, said electronics module being spatially and functionally separated from the motor vehicle locking module, wherein the motor vehicle locking module and the electronics module are connected to exchange data;
a first plug connector for connecting the electronics module directly to the motor vehicle locking module to establish a first mechanical and data connection between the electronics and motor vehicle locking modules, wherein the first plug connector is configured to be plugged into the electronics and motor vehicle locking modules to establish the first mechanical and data connection and plugged out of the electronics and motor vehicle locking modules to sever the first mechanical and data connection,
wherein the first plug is configured for extension through an opening in an interior wall of the motor vehicle to selectively establish and sever the mechanical and data connection between the motor vehicle locking module on a first side of the wall and the electronics module on a second side of the wall opposite the first side,
wherein the interior wall is a dividing wall between a wet space and a dry space of the motor vehicle door, and wherein the first side of the wall is wet space and the second side is the dry space; and
a second plug connector for connecting the electronics module directly to a cable harness to establish a second mechanical and data connection between the electronics module and the cable harness, wherein the second plug connector is configured to be plugged in to establish the second mechanical and data connection and plugged out to sever the second mechanical and data connection;
wherein the dividing wall has a seal around the opening.

17. The motor vehicle door according to claim 16, wherein first plug connector further is configured to provide a power supply connection between the electronics and motor vehicle locking modules.

18. The motor vehicle door according to claim 16, wherein second plug connector further is configured to provide a power supply connection between the electronics module and the cable harness.

* * * * *